United States Patent [19]
Tozoni et al.

[11] Patent Number: 5,208,496
[45] Date of Patent: May 4, 1993

[54] LINEAR SYNCHRONOUS MOTOR HAVING VARIABLE POLE PITCHES

[75] Inventors: Oleg Tozoni, Rockville; Edward Dantsker, Lanham, both of Md.

[73] Assignee: Maglev Technology, Inc., Gaithersburg, Md.

[21] Appl. No.: 691,430

[22] Filed: Apr. 25, 1991

Related U.S. Application Data

[63] Continuation-in-part of Ser. No. 583,082, Sep. 17, 1990, abandoned.

[51] Int. Cl.$^5$ .................. H02K 41/00; B60L 13/04
[52] U.S. Cl. ................................. 310/12; 318/135; 104/282
[58] Field of Search ............... 310/12, 13, 14, 80, 310/83, 90.5; 318/135; 104/282, 283, 286, 290, 292

[56] References Cited

U.S. PATENT DOCUMENTS

| | | | |
|---|---|---|---|
| 3,934,183 | 1/1976 | Säufferer | 318/135 |
| 4,131,811 | 12/1978 | Apsit et al. | 310/12 |
| 4,603,640 | 8/1986 | Miller et al. | 104/282 |
| 4,742,255 | 5/1988 | Nakagawa et al. | 310/12 |
| 4,953,470 | 9/1990 | Yamaguchi | 104/282 |

OTHER PUBLICATIONS

Argonne National Laboratory: Maglev Vehicles and Superconductor Technology: Integration of High-Speed Ground Transportation into the Air Travel System; L. R. Johnson et al.; Apr. 1989.

Primary Examiner—Steven L. Stephan
Assistant Examiner—Matthew Nguyen
Attorney, Agent, or Firm—Kenyon & Kenyon

[57] ABSTRACT

A linear synchronous motor for a high speed, ground transportation vehicle is provided. The motor includes a linear stator assembly that is divided into sections. The stator assembly has an air gap and generates a magnetic field traveling wave therein from a constant frequency alternating current. The traveling wave has variable speeds and accelerations along different sections of the stator. A rotor assembly has a plurality of magnets forming at least one pole-pitch of a variable length. The rotor assembly is coupled to the vehicle and disposed in the air gap of the stator and runs laterally therewith, producing an attractive force between a magnetic field of the rotor and the traveling wave of the stator. The magnetic field of the rotor propels the vehicle. The magnetic field of the rotor also generates a levitation force levitating the vehicle. A synchronizing unit is operatively associated with the rotor assembly to vary the length of the pole-pitch so that the pole-pitch length is substantially equal to one-half the length of the traveling wave at any given position along the linear stator assembly.

27 Claims, 6 Drawing Sheets

LINEAR SYNCHRONOUS MOTOR HAVING VARIABLE POLE PITCHES

CROSS-REFERENCE TO RELATED APPLICATIONS

The present application is a continuation-in-part of U.S. Ser. No. 07/583,082 filed on Sept. 17, 1990.

BACKGROUND OF THE INVENTION

The invention relates generally to linear synchronous motors and more particularly to a linear synchronous motor having variable pole pitches generating propulsion and levitation forces for a high speed transportation system.

The concept of using superconducting magnets for a magnetic levitation transportation system has been developed and proven to work in the United States. An alternating—current (AC) magnetic repulsion system was first conceived by Emile Bachlelet, a French engineer working in the U.S. He built a model vehicle in 1912 using magnetic forces for levitation and repulsion. Bachlet's concept law dormant until the mid-1960's when James Powell and Gordon Danby, both from Brookhaven National Laboratory, proposed that superconducting magnets in combination with linear synchronous motors could make the concept practical. (Powell, J. R., and Danby, G. R., 1967, *A 300-mph Magnetically Suspended Train*, Mechanical Engineering, 89:30–35, November; U.S. Pat. No. 3,470,828) From their concepts their invention of the low-drag, null-flux guideway using discrete coils followed, an approach that is still viable and a variant of which is being used in Japan.

Several methods have been proposed for propelling magnetic levitation (Maglev) vehicles. The most compatible appears to be the long stator/guideway linear synchronous motor. This concept uses a stator winding in the form of a guideway that is supplied with three-phase AC power and energized sequentially, causing a magnetic wave to travel along the guideway. This traveling magnetic wave interacts with the vehicle-borne superconductive coils to propel the vehicle.

In 1986 a linear synchronous unipolar motor of original construction was developed at Boeing Aerospace, as disclosed in Gilliland, R. G., D. D. Lyttle, and G. W. Pearson, *Integrated Magnetic Propulsion and Suspension, Final Report*, prepared by Boeing Aerospace Co., for U.S. Dept. of Transportation, Urban Mass Transportation Administration Report UMTA-WA-06-0014-086-2, December, 1986.

The latest review of the Maglev technology is fully reflected in the report of Argonne National Laboratory, "Maglev Vehicles and Superconductor Technology: Integration of High Speed Ground Transportation into the Air Travel System" (Available from the National Technical Information Services, US Department of Commerce, 5285 Port Royal Road, Springfield, Va. 22161).

The construction of the linear synchronous motors that have been presented so far have the following limitations:

1. To start up and accelerate its moving part, the linear motor needs to be supplied with a special generator having currents of varying frequency that smoothly increase according to the vehicle's desired acceleration/deceleration;

2. The recovery of energy when the vehicle is decelerating is impeded and thus will not occur;

3. The power factor of known linear synchronous motors is very low;

4. If superconductivity failure occurs, a severe accident may result;

5. To create the capacity for levitation, it is necessary to introduce a special winding on the stator that results in the waste of additional energy; and 6. To shield the magnetic field of the superconductive magnets, which is dangerous to human health, a considerable increase in the vehicle's weight and dimensions is required.

In view of the prior art, there is a need for a linear synchronous motor that overcomes the above-mentioned limitations.

SUMMARY OF THE INVENTION

The invention solves these problems by providing a linear synchronous motor for a high speed, ground transportation vehicle that includes a linear stator assembly divided into sections. The stator assembly has an air gap and generates a magnetic field traveling wave therein from a constant frequency alternating current. The traveling wave has variable speeds and accelerations along different sections of the stator. A rotor assembly has a plurality of magnets forming at least one pole-pitch of a variable length. The rotor assembly is coupled to the vehicle and disposed in the air gap of the stator and runs laterally therewith, producing an attractive force between a magnetic field of the rotor and the traveling wave of the stator. The magnetic field of the rotor propels the vehicle. A synchronizing unit is operatively associated with the rotor assembly to vary the length of the pole-pitch so that the pole-pitch length is substantially equal to one-half the length of the traveling wave at any given position along the linear stator assembly.

It is known that any synchronous motor can be accelerated by an outside force or by a gradual change in the frequency of the current supplied to its stator windings. However, an alternate way to achieve acceleration of the motor is by changing the sizes of the pole pitches in the rotor with a simultaneous change of the coil sizes in the stator. The pole pitch is determined by the number of the adjacent magnets oriented in one direction. Consequently, acceleration can be achieved while the current frequency remains constant.

Therefore, unlike the known linear synchronous motors, the motor according to the invention has a stationary part (i.e., the guideway/stator) with phase current coils whose dimensions and relative distances between their centers increase during acceleration and decrease during deceleration.

The moving part of the motor, the propulsion magnet, is a series of identical permanent magnets shaped as right circular cylinders that are placed in a magnetic magazine located in a vehicle.

The longitudinal axes of these cylindrical permanent magnets are oriented in the vertical direction and across the line of the vehicle movement. All the permanent magnets are magnetized across their longitudinal axes such that the poles are located on opposite sides of the longitudinal axes. The permanent magnets can be rotated about their longitudinal axis. By rotating one or more of the permanent magnets in the magnetic magazine, the distances between the centers of the adjacent poles (pole pitches) of the propulsion magnet can be continuously changed to be in synchronization with the guideway/stator during acceleration and deceleration of the vehicle.

In a linear synchronous motor, synchronization is defined as a coincidence in the direction and speed of the magnetic fields of both the stator and the propulsion magnet. By rotating one or more of the single permanent magnets, with a resulting change in the length of the pole pitches determined by a preset program, synchronization of the magnetic fields in the air gap of the motor will occur. The propulsion force is created by the interaction between the traveling wave of the magnetic field in the air gap of the guideway/stator and the magnetic field of the propulsion agent.

The levitation force is produced by the attractive magnetic force between the propulsion magnet and the laminated steel of the guideway/stator cores due to the asymmetric position of the rotor relative to the magnetic circuit of the stator. The levitation force is maintained automatically, depending on the weight exerted on the propulsion magnet by the vehicle.

BRIEF DESCRIPTION OF THE DRAWINGS

FIGS. 9A and 9B are graphical illustrations of the synchronization process of the traveling wave of the stator and the magnetic field of the propulsion magnets at a velocity of $V_1$ and $V_2$, respectively.

DETAILED DESCRIPTION

The linear synchronous motor of the present invention will be described as a power source for a train. However, this motor may be used with other types of vehicles. Furthermore, the motor may be used for purposes other than those illustrated herein. For example, the motor may be used to launch air-borne and space-borne vehicles.

Figure 5:
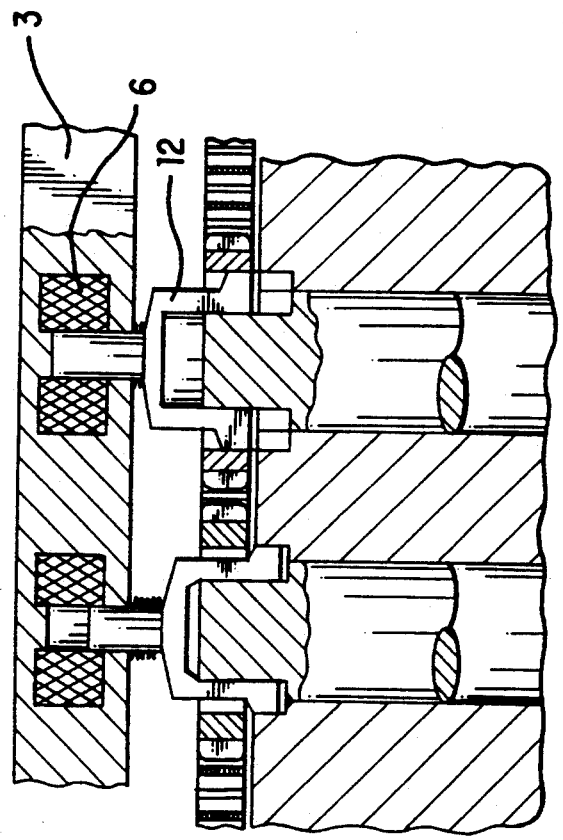
FIG. 5 is a top view of the propulsion magnets shown in FIG. 3.

As seen in FIG. 5, the linear synchronous motor according to the invention includes a guideway/stator 2 which extends along the entire guideway of the train; propulsion/suspension magnets 10 which are fixed to the vehicle chassis 7; and a mechanism for regulating the distances between the centers of the adjacent poles (i.e. the pole pitch regulation mechanism 3) of the propulsion magnet.

The guideway/stator 2 includes an elongated guideway having a toothed, laminated magnetic circuit 4 extending along the length of the guideway. The guideway 2 has sections for accelerating and decelerating the vehicle, and windings, whose phase coils 5 are housed in the slots of the magnetic circuit.

The guideway/stator 2 includes three sections: an acceleration section, a constant velocity section and a deceleration section.

Figures 1A, 1B:
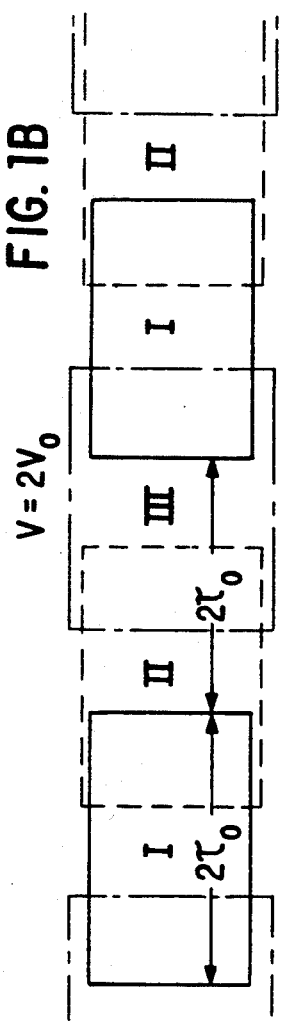
FIGS. 1A, 1B, and 1C are schematic diagrams of the phase coils of the stator windings illustrating, respectively, the beginning of the acceleration section where the vehicle velocity is $V=V_o$, a portion of the acceleration section where the vehicle velocity is $V=2V_o$, and a portion of the stator where the velocity is $V=3V_o$.
Figure 1C:
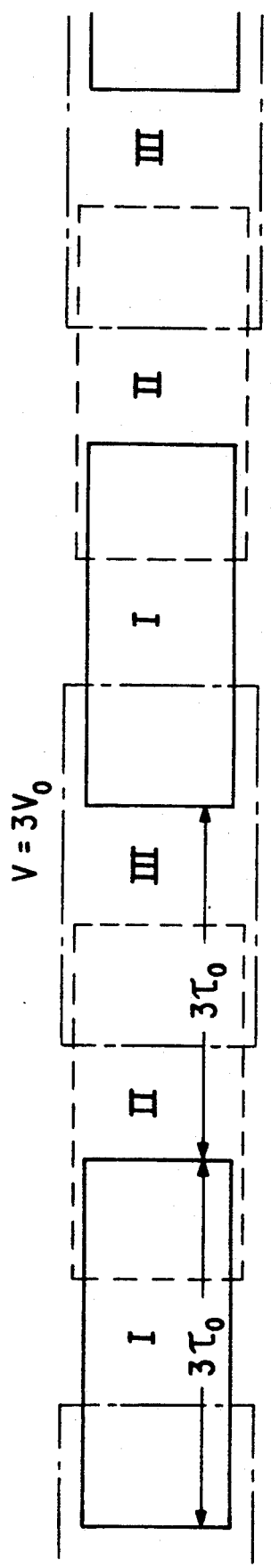

The stator winding are distributed non-uniformly along the guideway/stator 2 (see FIGS. 1 and 2) In the acceleration section of the stator 2, the length of the coils and the distances between the centers of the adjacent coils increase gradually in the direction of acceleration. This results in an increase in the wavelength and the speed of the traveling wave of the magnetic field in the air gap along the acceleration section of the guideway/stator until the lengths and distances between the coils correspond to the desired velocity (V) of the vehicle.

The constant velocity section is designed in such a way that the lengths of the coils and the distances between their centers are constant.

The deceleration section is similar to acceleration section, but the lengths of the winding coils, and the distances between their centers, decrease in the direction of the vehicle's motion.

During the flow of 3-phase current through the stator winding, a traveling wave of the magnetic field is created. Its wavelength and velocity V are proportional to the lengths of the coils and the distances between their centers.

The traveling wave interacts with the poles of the propulsion/suspension magnet fixed to the chassis 7 of the vehicle to provide the vehicle with the propulsion force.

The propulsion/suspension magnet is the source for propulsion of the vehicle and comprises a plurality of identical permanent magnets 10. Each magnet 10 is shaped in the form of a right circular cylinder and is magnetized across it longitudinal axis such that its poles are located on opposite sides of the longitudinal axis (see FIG. 8). All the permanent magnets 10 are housed in a single magazine 8. The magazine is made of electromagnetic steel and non-magnetic metal. Each permanent magnet 10 in the magazine may be rotated around its longitudinal axis in order to change the poles' pitch. The pole pitch Δ is determined by the number of adjacent magnets 10 oriented in one direction.

The propulsion force is a function of the shift $\theta$ (see FIGS. 2 and 9) between the traveling wave of the magnetic field in the air gap of the stator 2 and the magnetic field of the propulsion magnet 10. The above-mentioned magnetic fields will interact when the velocities and the directions of both fields coincide (e.g., when synchronization is achieved). The linear shift between the magnetic fields will increase when the resistance to the vehicle's motion increases. Since the field tubes of the magnetic field stretch and compress cross-sectionally, the propulsion force will automatically increase to a new value which is equal to the resistance to the motion.

Figures 2A, 2B:
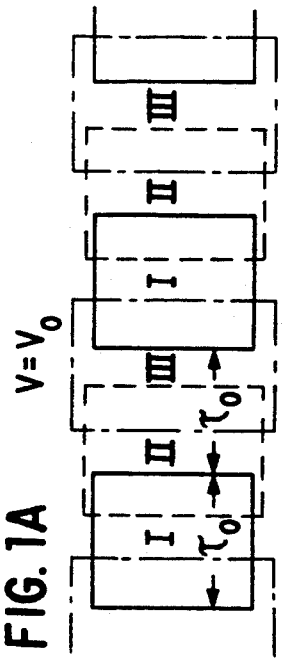
FIG. 2A shows the magnetic fields generated by the stator windings, the magnetic fields generated by the permanent magnets, and a corresponding portion of the propulsion magnet when the vehicle velocity is $V=V_o$.
FIG. 2B shows the magnetic fields generated by the stator windings, the magnetic fields generated by the permanent magnets, and a corresponding portion of the propulsion magnet when the vehicle velocity is $V=2V_o$.
Figure 2C:
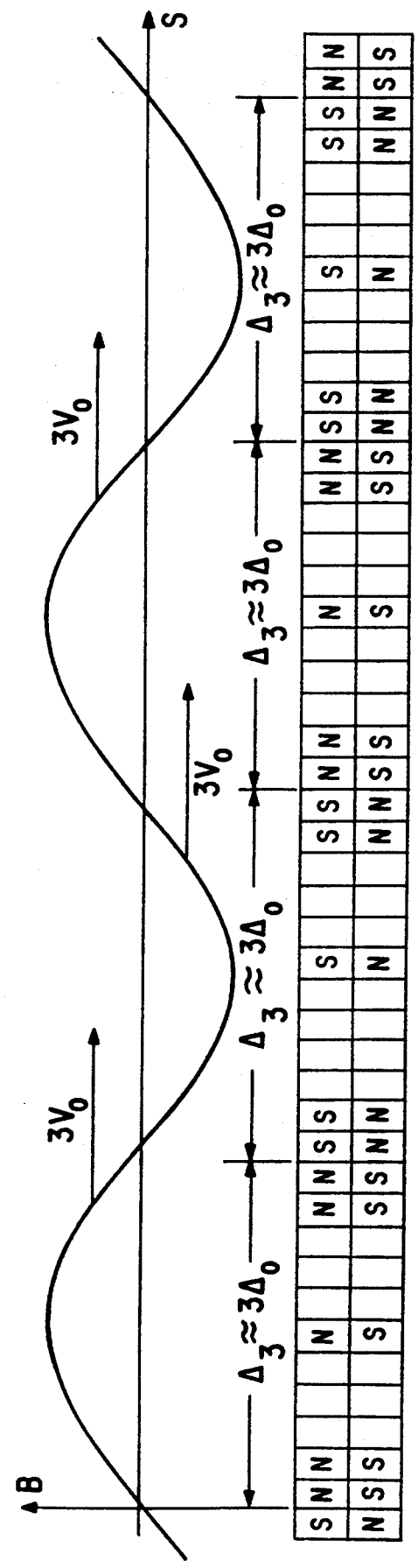
FIG. 2 shows the magnetic fields generated by the stator windings and a corresponding portion of the propulsion magnet when the vehicle velocity is $V=3V_o$.

In order to create the propulsive force on the moving magnets 10, it is necessary to synchronize the size Δ of the pole pitches with the wavelength λ of the traveling magnetic field in the air gap of the stator (see FIG. 2). Consequently, it is necessary to make the size of two adjacent pole pitches 2Δ equal to the wavelength λ of the magnetic field.

The above-mentioned synchronization is obtained by using a pole pitch regulation mechanism 3 which includes:

1. A preset program designed to determine the required sizes of the pole pitches while the propulsion magnet is moving through the corresponding sections of the stator during acceleration or deceleration;

2. An electromechanical driver 9 which mechanically changes the pole pitches by rotating certain of the permanent magnets 10 around their longitudinal axis by 180 degrees; and 3. A distributing device 6 which in accordance with the preset program will engage the appropriate permanent magnets 10 with the electromechanical driver 9.

Figure 8A:
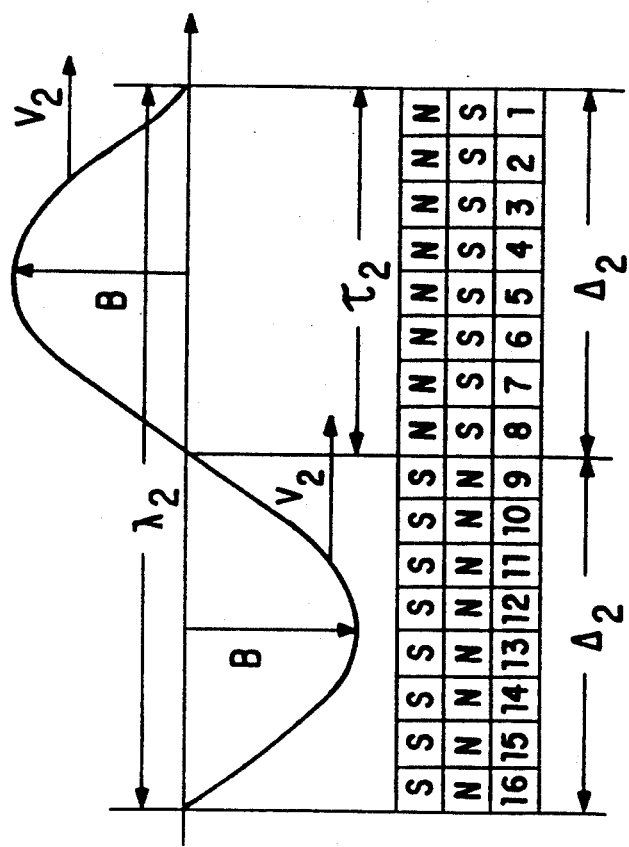
FIG. 8 is a schematic, cross-sectional view of the linear synchronous motor illustrating the origination of the levitation force.
Figure 8B:
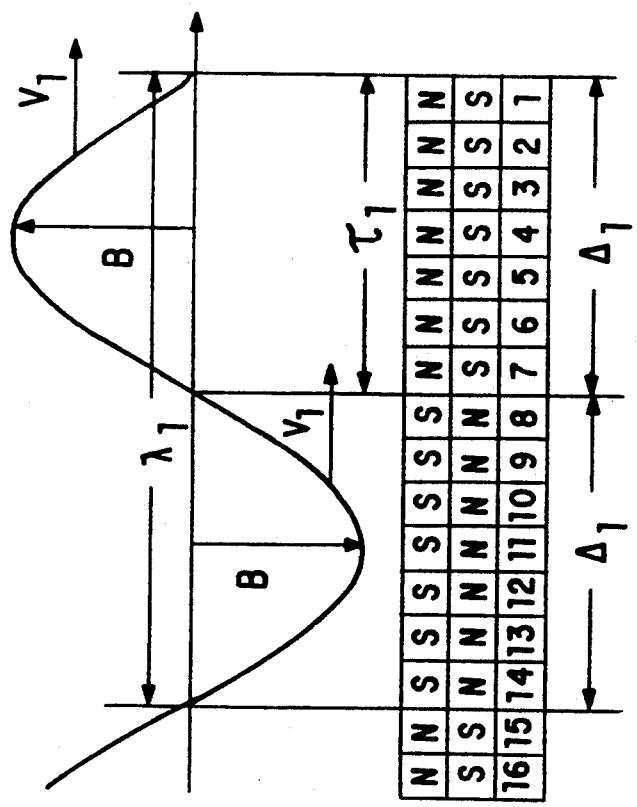

The magnetic levitating effect is achieved by positioning the propulsion magnets 10 asymmetrically with respect to the magnetic circuit of the guideway/stator, as illustrated in FIG. 8. The suspension (levitation) force F shown in FIG. 8 is produced by the attractive forces between the propulsion magnet 10 and the laminated steel of the magnetic circuit 4 of the guideway/stator, and is equal to the vector sum of the attractive forces.

Figure 3:
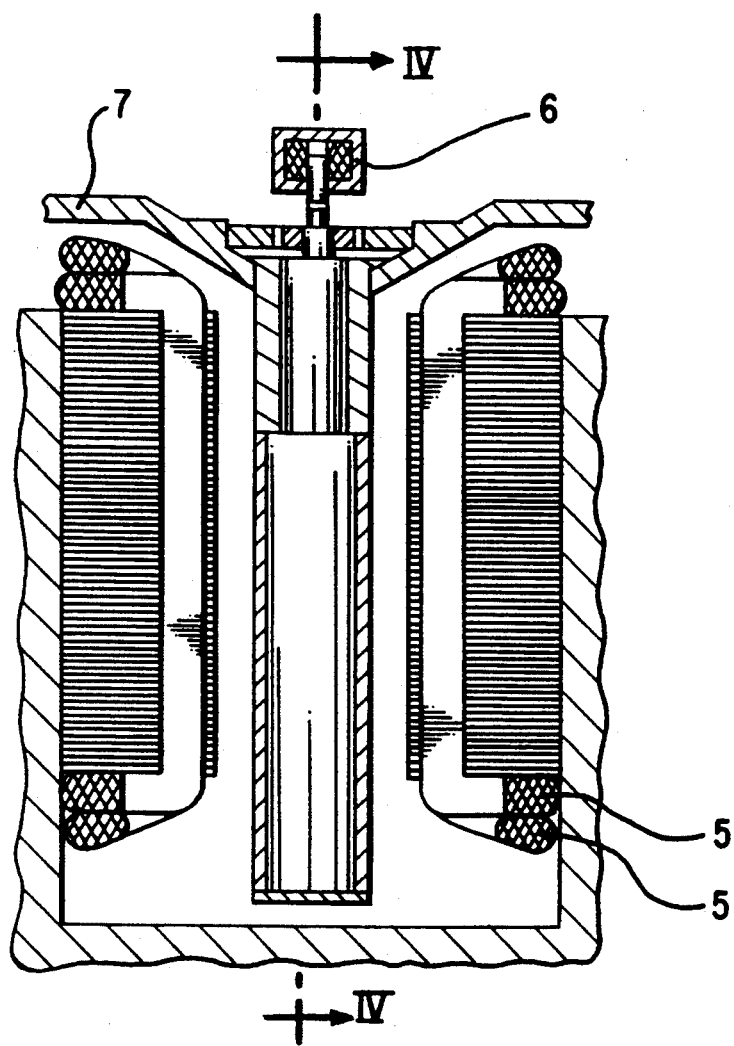
FIG. 3 is a partial, cross-sectional view of the linear synchronous motor constructed according to the principles of the invention.
Figure 4:
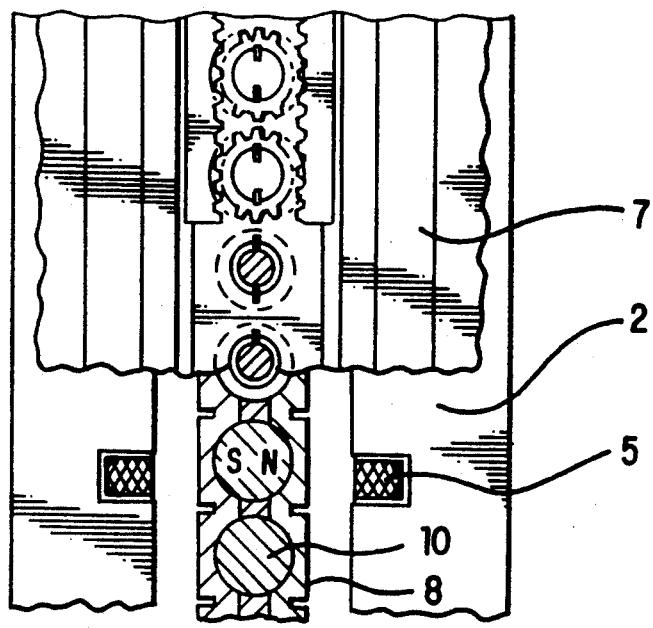
FIG. 4 is a side view of a single iron core of the guideway/stator.

As seen in FIG. 3, the guideway/stator 2 is built on a concrete foundation 11. The magnetic circuits are made from thin laminated sheets of electromechanical steel and attached to the concrete foundation (see FIG. 4).

The windings 5, which are formed from 3-phase coils, are positioned in the slots of the magnetic circuits 4. The entire construction is firmly attached to the concrete foundation 11 of the guideway/stator.

The Acceleration Section:

As 3-phase electrical current of constant frequency is applied to the windings 5 of the stator 2, a traveling wave of the magnetic field is produced in the air gap of the stator.

The wavelength λ of the traveling wave and its velocity (V) along the stator are directly proportional to the length τ of the coils and the distance $\frac{3}{2}\tau$ between the centers of the adjacent coils.

To increase the wavelength of the magnetic field and the velocity of the traveling wave, the coil sizes and the distance between their centers must increase in the direction of the vehicle's travel along the acceleration section of the guideway/stator 2.

If a traveling wave having an initial velocity $V_o$ is applied to the propulsion magnet 10 and the pole pitch Δ is equal to ½ of the wavelength, then the magnetic field of the stator 2 will interact with the permanent magnets 10, thus creating a propulsion force.

To maintain the propulsion force during the entire period of acceleration, it is necessary to change the size Δ of the pole pitches while simultaneously changing the wavelength λ. To accomplish this, the permanent magnets in the magnetic magazine that are adjacent to two pole pitches will be rotated 180 degrees about their longitudinal axis. This rotation will increase the pole pitch length to match the wavelength λ on the given portion of the guideway/stator 2. (The number of the pole pitches in the magnetic magazine will, of course, decrease.)

The rotation of the permanent magnets 10 will be triggered during the vehicle's movement by vehicle position sensors located on the vehicle and in the guideway/stator 2. When the vehicle reaches the portion of the acceleration section of the guideway/stator 2 where the wavelength of the traveling wave of the magnetic field has increased by at least the diameter of a single permanent magnet 10, the sensor will activate the pole pitch regulation mechanism 3. Certain of the magnets will then be selectively rotated in the magnetic magazine to increase the pole pitch so that it matches the wavelength.

The selection or the permanent magnets to be rotated will be predetermined by the positioning of the coils in the guideway/stator 2 and the desired acceleration distribution of the vehicle along the guideway/stator.

The phase shift θ (see FIG. 2) of any pole pitch relative to the corresponding half-wave must not be more than a value needed for synchronization. This value is well known from the theory of regular synchronous motors. The value of the propulsion force is a function of the value θ of the phase shift.

The development of the preset program is based on the comparison of the wavelength λ of the magnetic field of the stator to the position of the permanent magnets 10 in the magnetic magazine in each section of the guideway/stator 2. The preset program selects the particular permanent magnets 10 that are to be rotated in order to achieve the above-mentioned synchronization.

The propulsion/suspension magnet is formed from a plurality of individual permanent magnets 10 mounted in the magnetic magazine B. The pole pitch Δ is determined by the number of adjacent magnets 10 oriented in one direction.

The change of the pole pitch is achieved by rotating certain magnets 10 within the magnetic magazine 8. If a rotation of just one single magnet 10 is needed for the first pole pitch, then two magnets 10 must be turned for the second, three for the third etc.

It is important to note that a change of the pole pitch cannot be achieved continuously. The minimum change in the pitch is equal to the diameter of a single permanent magnet 10. This precondition limits the selection of the desired frequency of the supplied current since the wavelength and therefore the pole pitch is a function of the current's frequency in the coils.

To achieve a smooth acceleration, the increase in the coil size will be gradual along the whole acceleration portion of the guideway 2 to minimize discomfort for the passengers during the acceleration/deceleration stage.

The Constant Velocity Section:

In this section, the guideway/stator is composed of coils of equal size and equal distances between their centers. Therefore, the pole pitch of the magnetic magazine 8 remains constant during the vehicle's travel along this section.

The Deceleration Section:

The guideway/stator 2 of this section is substantially the same as the acceleration section, except that the size of the coils and the distances between the centers of the adjacent coils decrease rather than increase in the direction of the vehicle's travel. This deceleration section of the guideway/stator 2 decelerates the vehicle and recovers most of the kinetic energy of the vehicle.

The positioning of the coils is such that the distances between their centers and their sizes decrease along the deceleration section of the guideway/stator 2. The velocity of the vehicle (as achieved in the constant velocity section) is such that the propulsion magnet leads the traveling wave of the magnetic field of the guideway/stator 2. As a result, the shift $\theta$ between the traveling wave of the magnetic field of the guideway/stator 2 and the magnetic field generated by the permanent magnets 10 of the propulsion magnet reverses sign. This sign reversal causes the propulsion force to act as a dragging force, which is equal to the inertial force of the vehicle. Therefore, the current in the stator windings reverses direction.

Simultaneously, the kinetic energy of the vehicle is converted into electric energy and returns into the circuit. Therefore, the linear synchronous motor, during deceleration, functions as a generator, recovering the kinetic energy of the vehicle.

Like any rotating synchronous motor, the linear synchronous motor automatically creates the propulsive force which is equal to the dragging force.

As seen in FIG. 8, the levitation force F is created when the propulsion magnets 10 are positioned asymmetrically relative to the magnetic circuit of the guideway/stator 2. The value of this force F increases with the size $\delta$ of the asymmetry.

The levitation force F is a function of the vertical shift $\delta$ (FIG. 8) of the propulsion magnet 10 (i.e. rotor) relative to the iron cores of the stator. The weight of the vehicle forces the propulsion magnets 10 to shift downwards in the air gap of the stator. Consequently, the field tubes of the magnetic field stretch and compress. As a result, the levitation force increases and reaches a magnitude equal to the weight of the vehicle. Thus, regulation of the levitation force is achieved automatically.

The change of the pole pitch in the magnetic magazine 8 is regulated by the preset program through electromechanical devices. The purpose of the pole pitch regulation mechanism 3 is to synchronize the pole pitches with the wavelength $\lambda$ of the traveling wave in the acceleration and deceleration sections. The pole pitch of the propulsion magnet at a given time during the vehicle's motion must coincide with the wavelength $\lambda$ of the traveling magnetic wave in the air gap of the guideway/stator.

This requirement is illustrated in FIGS. 9A and 9B, where the positioning of the coils in the acceleration section of the guideway/stator 2 results in a change in the wavelength $\lambda$ of the traveling wave that is equal to two diameters of a single permanent magnet 10.

FIG. 9A shows a wavelength equal to $2\times 7$ diameters of the single permanent magnets 10. FIG. 9B illustrates a wavelength at a later position in the acceleration section in which the sizes and positioning of the coils is such that the wavelength is increased by two permanent magnet diameters and thus equals $2\times 8$ diameters of a single permanent magnet. In order to synchronize the linear motor, permanent magnets numbered 8, 15, 16 in FIG. 9A must be rotated 180 degrees.

The selection of specific single permanent magnets 10 for the remainder of the acceleration/deceleration sections is done analogously.

Figure 6:
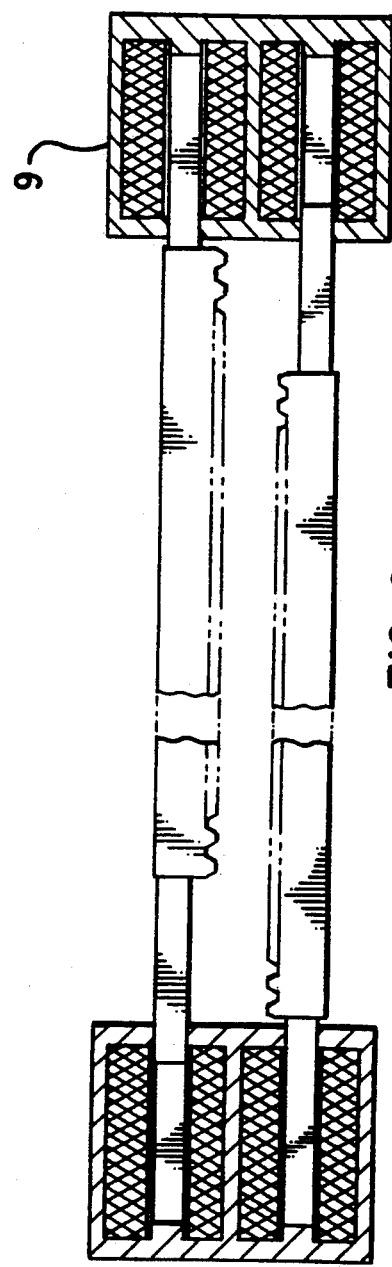
FIG. 6 is a schematic illustration of a distribution device of a pole pitch regulation mechanism taken through line IV—IV in FIG. 3.
Figure 7:
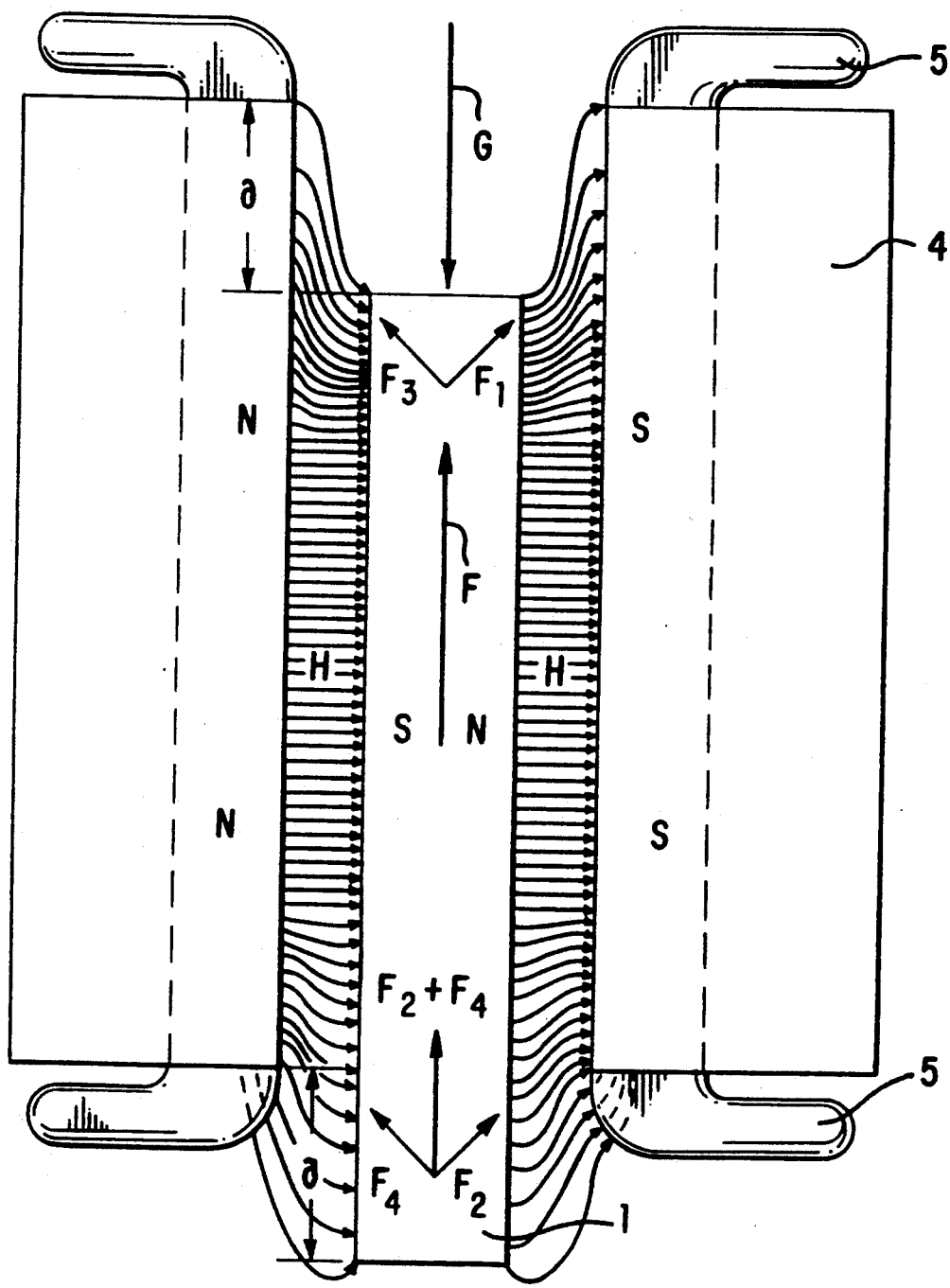
FIG. 7 is a plan view of the electromechanical driver for the pole pitch regulation mechanism.

As seen in FIGS. 6 and 7, a distributing device 6 is used for coupling the selected permanent magnets 10 to be rotated to the electromechanical driver 9. It includes a plurality of solenoids to engage each permanent magnet to the electromechanical driver 9.

The distributing device 6 is controlled by the preset program which activates or deactivates certain of the solenoids. When a solenoid is turned on, the associated permanent magnet 10 engages a gear of the driver by the sliding key 12. The sliding key secures the associated permanent magnet within the magnetic magazine 8 and engages this permanent magnet 10 with the gear of the electromechanical driver 9 to achieve the change of the pole pitch.

The electromechanical driver 9 includes four solenoids and two toothed racks. As two of the solenoids are switched on, the toothed racks shift and rotate all the gears. Those gears engaged with the permanent magnets 10 by the sliding keys turn the permanent magnets 10. The solenoids of the electromechanical driver are activated according to the preset program to move the gear rack and turn only those magnets whose keys are engaged with the gear racks of the driving mechanism.

The purpose of the electromechanical driver 9 is to rotate the selected permanent magnets 10 at certain selected times to achieve synchronization of the linear motor.

In one particular embodiment of the invention, the permanent magnets 10 have a length of 25 cm and a diameter of 6 cm and are formed from a combination of the rare-earth elements neodymium, iron, and boron (i.e. Crumax 355). The asymmetry shift $\delta$ has a value of 5 cm and the two air gaps between the permanent magnets 10 and the stator 2 are each 3 cm. In the acceleration section of the stator, the length of the phase coils increase from 1 m to 6 m and the spacing between the centers of adjacent coils increases from 0.666 m to 4 m over a distance that is dependent on the particular design of the stator. This distance determines the maximum velocity that the vehicle can attain. Likewise, in the deceleration section, the length of phase coils decrease from 6 m to 1m and the spacing between the centers of adjacent coils decreases from 4 m to 0.666 m over the same distance as in the acceleration section. In the constant velocity section, the length of the coils is 6 m and the spacing between centers of adjacent coils is 4 m. The current in the stator windings has an amplitude of 10,000 to 15,000 amps/m and a frequency of 15 hertz.

What is claimed is:

1. A linear synchronous motor for a high speed vehicle comprising:

a. a linear stator assembly divided into sections and having an air gap, said stator assembly generating a magnetic field traveling wave in said air gap from an alternating current source, said traveling wave having variable speeds and accelerations along different sections of said stator;

b. a rotor assembly having at least one magnet forming at least one pole-pitch of a selected length that is selectively variable while the vehicle is in motion, said rotor assembly coupled to the vehicle and disposed in said air gap of the stator and movable laterally with respect to said stator, said rotor assembly and said stator assembly together producing an attractive force between a magnetic field of said motor and said traveling wave of the stator, said magnetic field of said rotor propelling said vehicle; and c. a synchronizing unit operatively associated with said rotor assembly to vary the length of the pole-pitch such that said pole-pitch length is substantially equal to one-half the length of the traveling wave at any given position along said linear stator assembly.

2. The linear synchronous motor of claim 1 wherein said magnetic field of said rotor generates a levitation force levitating the vehicle.

3. The linear synchronous motor of claim 2 wherein said linear stator assembly comprises two mirror-image, symmetrical cores having a lateral extent with said air gap therebetween, each of said iron cores having three phase winding formed of phase coils, a length of the phase coils and a spacing between centers of adjacent phase coils varying along the lateral extent of said stator and providing predetermined changes in the length and speed of the magnetic field traveling wave in said air gap, said different sections of said stator including an acceleration section, a constant-speed section and a deceleration section.

4. The linear synchronous motor of claim 3 wherein the length of said phase coils and the spacings between centers of adjacent phase coils in said acceleration section increase in a direction of travel of said rotor assembly.

5. The linear synchronous motor of claim 4 wherein the length of said phase coils and the spacing between centers of adjacent phase coils in said deceleration section decrease in a direction of travel of said rotor assembly.

6. The linear synchronous motor of claim 5 wherein the magnetic field of the rotor leads the traveling wave of the stator in said deceleration section of the stator upon braking of the vehicle and in said constant speed section of the stator upon descent of the vehicle, said stator automatically recovering kinetic energy from the vehicle and converting it into electrical power upon braking or descent of the vehicle.

7. The linear synchronous motor of claim 2 wherein said magnets each comprise right circular cylindrical permanent magnets having a longitudinal axis and a base, said longitudinal axes disposed in a common first plane and said bases disposed in a common second place perpendicular to said first plate, said permanent magnets having a direction of magnetization across said longitudinal axis, and each of said magnets being rotatable about said longitudinal axis to vary said pole pitch length of said rotor.

8. The linear synchronous motor of claim 7 wherein said synchronizing unit monitors predetermined changes in the length of said traveling wave during movement of the rotor and rotates said cylindrical permanent magnets of said rotor assembly so that said pole pitch length is substantially equal to one-half the length of the traveling wave at any point in time.

9. The linear synchronous motor of claim 7 wherein said permanent magnets of said rotor are downwardly movable an asymmetry distance in said air gap upon exertion of weight of said vehicle, said rotor automatically generating said levitation force that is proportional to said asymmetry distance and determined by a vector sum of attractive forces between said permanent magnets of the rotor and said iron cores of the stator to suspend the vehicle even during a loss of power.

10. The linear synchronous motor of claim 1 wherein said at least one magnet is a superconducting magnet.

11. The linear synchronous motor of claim 1 wherein said alternating current source is a constant frequency alternating current source.

12. A linear synchronous motor comprising:
a) a linear stator assembly having a plurality of phase coils extending along its length;
b) a propulsion magnet assembly rigidly coupled to a vehicle and operatively associated with, and movable along, the linear stator assembly to establish a gap therebetween, the propulsion magnet assembly having a plurality of permanent magnets arranged in a generally linear array, and defining a pole pitch;
c) means, operatively associated with the linear stator assembly, for generating a magnetic field traveling wave in the gap that has a variable wavelength along the length of the linear stator; and
d) means, operatively associated with the propulsion magnet assembly, for varying the pole pitch of the permanent magnet array such that the pole pitch is substantially equal to one-half the wavelength of the traveling wave at any given point along the linear stator.

13. The linear synchronous motor of claim 12 wherein the stator assembly comprises a core of magnetic material and a plurality of coils disposed on the core.

14. The linear synchronous motor of claim 13 wherein the linear stator has an acceleration section in which a length of the phase coils and a spacing between centers of adjacent coils both increase in a direction of travel of the propulsion magnet assembly.

15. The linear synchronous motor of claim 14 wherein the linear stator assembly has a constant speed section in which the length of the coils and the spacing between centers of adjacent coils are substantially uniform.

16. The linear synchronous motor of claim 15 wherein the linear stator assembly has a deceleration section in which the length of the coils and the spacing between centers of adjacent coils decrease in the direction of travel of the propulsion magnet assembly.

17. The linear synchronous motor of claim 16 wherein said constant speed section of said stator assembly is located between said acceleration section and said deceleration section.

18. The linear synchronous motor of claim 12 wherein each of said permanent magnets of the propulsion magnet assembly have a longitudinal axis and first and second longitudinal portions on opposing sides of the longitudinal axis, said first and second longitudinal portions having opposite magnetic poles relative to one another.

19. The linear synchronous motor of claim 18 wherein the longitudinal axes of the permanent magnets are substantially parallel to each another.

20. The linear synchronous motor of claim 19 wherein said means for varying the pole pitch comprises means for selectively rotating at least one permanent magnet about its longitudinal axis.

21. The linear synchronous motor of claim 12 further comprising means for generating a levitation force against gravitational forces on the propulsion magnet assembly when the propulsion magnet assembly is displaced below a level of the linear stator assembly.

22. A linear synchronous motor comprising:
a) a linear stator assembly having a laminated core extending along its length;

b) a magnet assembly rigidly coupled to a vehicle and operatively associated with, and movable along, the linear stator assembly to establish a gap therebetween, the magnet assembly having at least one permanent magnet arranged in a generally linear array, said at least one magnet being downwardly movable an asymmetry distance in said air gap upon exertion of gravitational forces caused by a weight of the vehicle, said at least one magnet automatically generating a levitation force that is proportional to said asymmetry distance and determined by a vector sum of attractive forces between said at least one magnet and said linear stator assembly to suspend the vehicle.

23. The linear synchronous motor of claim 22 wherein said at least one magnet is a permanent magnet.

24. The linear synchronous motor of claim 22 wherein said at least one magnet is a superconducting magnet.

25. A linear synchronous motor comprising:
a. a linear stator assembly having two ferromagnetic cores symmetrical about a plane such that an air gap is formed between said bores that extends in a longitudinal direction substantially parallel to said plane, each of said ferromagnetic cores having windings formed of phase coils, a length of the phase coils and a spacing between centers of adjacent phase coils varying along a longitudinal axis of said stator and providing predetermined changes in the length and speed of magnetic field traveling waves generated in aid air gap by the phase coils of each ferromagnetic core of said stator assembly; and b. a propulsion magnet assembly rigidly coupled to a vehicle and disposed in said air gap of said stator assembly whereby an attractive force is produced between a magnetic field of said propulsion magnet assembly and said traveling waves of said stator assembly, said magnetic field of said propulsion magnet assembly propelling said vehicle.

26. The linear synchronous motor of claim 25 wherein said stator assembly further comprises:
a. an acceleration section in which the length of the phase coils and a spacing between centers of adjacent phase coils both increase in a direction of travel of the propulsion magnet assembly;
b. a constant speed section in which the length of the phase coils and spacing between centers of adjacent phase coils are substantially uniform; and
c. a deceleration section in which the length of the phase coils and a spacing between centers of adjacent phase coils both decrease in a direction of travel of the propulsion magnet assembly.

27. A linear synchronous motor comprising:
a. a linear stator assembly having a first and second plurality of phase coils symmetrical about a plane such that an air gap is formed between said first and second plurality of coils that extends in a longitudinal direction substantially parallel to said plane, and
b. a propulsion magnet assembly rigidly coupled to a vehicle and disposed in said air gap of said stator assembly whereby an attractive force is produced between a magnetic field of said propulsion magnet assembly and said traveling waves of said stator assembly, said magnetic field of said propulsion magnet assembly propelling said vehicle.

* * * * *

UNITED STATES PATENT AND TRADEMARK OFFICE
CERTIFICATE OF CORRECTION

PATENT NO. : 5,208,496  
DATED : May 4, 1993  
INVENTOR(S) : TOZONI, OLEG

Page 1 of 2

It is certified that error appears in the above-indentified patent and that said Letters Patent is hereby corrected as shown below:

| Column | Line | Corrections |
|---|---|---|
| 1 | 20 | Change "Bachlelet" to --Bachelet--. |
| 1 | 23 | Change "Bachlet's to --Bachelet's--; change "law" to --lay--. |
| 1 | 28 | Change "300-mph" to --*300-mph*--. |
| 1 | 29 | Change "Magnetically Suspended Train" to --*Magnetically Suspended Train*--. |
| 3 | 14 | Change "agent" to --magnet--. |
| 4 | 20 | Change "winding" to --windings--. |
| 4 | 21 | After "...2)" insert --,--. |
| 6 | 35 | Change "lo" to --10--. |
| 6 | 36 | Change "B" to --8--. |
| 8 | 35 | Change "increase" to --increases--. |
| 8 | 42 | Change "crease" to --creases--. |
| 8 | 66 | Change "motor" to --rotor--. |

UNITED STATES PATENT AND TRADEMARK OFFICE
CERTIFICATE OF CORRECTION

PATENT NO. : 5,208,496
DATED : May 4, 1993
INVENTOR(S) : TOZONI, OLEG

It is certified that error appears in the above-indentified patent and that said Letters Patent is hereby corrected as shown below:

| Column | Line | Corrections |
|---|---|---|
| 9 | 44 | Change "axes" to --axis--. |
| 9 | 45 | Change "place" to --plane--. |
| 9 | 46 | Change "plate" to --plane--. |
| 9 | 50 | Change "said rotor" to --the rotor--. |
| 11 | 24 | Change "bores" to --cores--. |
| 12 | 26 | After "plane," insert --a length of phase coils varying along a longitudinal axis of said stator;--. |

Signed and Sealed this

Twenty-second Day of March, 1994

Attest:

BRUCE LEHMAN

Attesting Officer   Commissioner of Patents and Trademarks